United States Patent
Melaragni

(10) Patent No.: US 9,840,119 B1
(45) Date of Patent: Dec. 12, 2017

(54) METHOD AND APPARATUS FOR DETECTING A STATUS OF AN ELECTRICAL CONNECTION WITH AN OBJECT

(71) Applicant: GM GLOBAL TECHNOLOGY OPERATIONS LLC, Detroit, MI (US)

(72) Inventor: Michael J. Melaragni, Rochester, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 0 days.

(21) Appl. No.: 15/251,735

(22) Filed: Aug. 30, 2016

(51) Int. Cl.
*B60D 1/36* (2006.01)
*G08B 21/18* (2006.01)

(52) U.S. Cl.
CPC .............. *B60D 1/36* (2013.01); *G08B 21/18* (2013.01)

(58) Field of Classification Search
CPC ... B60D 1/36; B60D 1/62; B60D 1/64; G08B 21/18; G08B 21/185
USPC .................. 340/431, 438, 682.2, 682.6, 687; 280/455.1, 477; 701/1, 36, 41
See application file for complete search history.

(56) References Cited

U.S. PATENT DOCUMENTS

| | | | | |
|---|---|---|---|---|
| 5,455,557 A * | 10/1995 | Noll | .......................... | B60D 1/36 280/477 |
| 5,861,802 A * | 1/1999 | Hungerink | ............. | B62D 53/12 280/433 |
| 6,452,485 B1 * | 9/2002 | Schutt | ................ | B62D 53/0828 280/435 |
| 9,352,623 B2 * | 5/2016 | Lynam | | |
| 2003/0168908 A1 * | 9/2003 | Robinson | .................. | B60T 7/10 303/7 |
| 2005/0151631 A1 * | 7/2005 | Honan, III | ............... | B60D 1/36 340/431 |
| 2005/0195073 A1 * | 9/2005 | Subbaraman | ............ | B60Q 1/38 340/465 |
| 2006/0085099 A1 * | 4/2006 | Burlak | ...................... | B60D 1/62 701/1 |
| 2012/0185131 A1 * | 7/2012 | Headley | ................. | B60D 1/245 701/41 |
| 2014/0012465 A1 * | 1/2014 | Shank | ...................... | B60D 1/58 701/36 |

* cited by examiner

*Primary Examiner* — Hung T Nguyen
(74) *Attorney, Agent, or Firm* — General Motors LLC Legal Staff

(57) ABSTRACT

A method and apparatus for detecting an object behind a vehicle are provided. The method includes determining a status of an electrical connection between an object and the vehicle; detecting a forward movement of the vehicle; based on the status of the electrical connection and the detecting of the forward movement, detecting the object behind the vehicle; and controlling to output a notification that alerts of the status of the electrical connection. The method and apparatus may be used to alert an operator when the trailer is electrically disconnected from the vehicle.

18 Claims, 3 Drawing Sheets

METHOD AND APPARATUS FOR DETECTING A STATUS OF AN ELECTRICAL CONNECTION WITH AN OBJECT

Apparatuses and methods consistent with exemplary embodiments relate to detecting the status of an electrical connection. More particularly, apparatuses and methods consistent with exemplary embodiments relate to detecting a status of an electrical connection between a trailer or an object and a vehicle.

SUMMARY

One or more exemplary embodiments provide a method and an apparatus that detect the status of an electrical connection to a trailer or an object. More particularly, one or more exemplary embodiments provide a method and an apparatus that detect the presence of an object or trailer by using a secondary sensor (e.g., an ultrasonic sensor, a camera, etc.) and that verify an electrical connection between the trailer and the vehicle.

According to an aspect of an exemplary embodiment, a method for detecting a status of an electrical connection with an object behind a vehicle is provided. The method includes: determining a status of an electrical connection between an object and the vehicle; detecting a forward movement of the vehicle; based on the status of the electrical connection and the detecting of the forward movement, detecting the object behind the vehicle; and controlling to output a notification that alerts of the status of the electrical connection.

The determining the status of the electrical connection may include determining that the vehicle is electrically disconnected from the object.

The determining the status of the electrical connection may include: retrieving a predetermined calibration value based on a measured baseline current of the electrical connection between the vehicle and the object; comparing an electrical signal of the object to the predetermined calibration value; and determining that the electrical signal of the object and the predetermined calibration value differ by a predetermined threshold.

The object may be a trailer attached to the vehicle.

The detecting the object behind the vehicle may include detecting that the object is within a predetermined distance of the vehicle during the forward movement of the vehicle.

The detecting the object behind the vehicle may include controlling to generate an ultrasonic frequency wave and detecting an echo of the ultrasonic frequency wave to determine whether the object is within the predetermined distance of the vehicle during the forward movement of the vehicle.

The detecting the object behind the vehicle may include determining whether an electromagnetic signal indicates that the object is within the predetermined distance of the vehicle during the forward movement of the vehicle.

The detecting the object behind the vehicle may include determining whether a static portion of an image from a rear facing camera of the vehicle is greater than a predetermined threshold portion of the image during the forward movement of the vehicle.

The forward movement of vehicle may include determining whether a speed of the vehicle is greater than a predetermined threshold speed.

According to an aspect of an exemplary embodiment, a non-transitory computer readable medium comprising computer executable instructions executable by a processor to perform method for detecting a status of an electrical connection with an object behind a vehicle is provided.

According to an aspect of an exemplary embodiment, an apparatus for detecting a status of an electrical connection with a second object behind a first object is provided. The apparatus includes: at least one memory comprising computer executable instructions; and at least one processor configured to read and execute the computer executable instructions. The computer executable instructions cause the at least one processor to: determine a status of an electrical connection between a first object and a second object; detect a forward movement of the first object; based on the status of the electrical connection and the detecting of the forward movement, detect a second object behind the first object; and control to output a notification alerting of the status of the electrical connection.

The computer executable instructions may further cause the at least one processor to determine the status of the electrical connection between the first object and the second object by determining that the status of the electrical connection indicates the second object is electrically disconnected from the first object.

The computer executable instructions may further cause the at least one processor to determine the status of the electrical connection between the first object and the second object by: retrieving a predetermined calibration value based on a measured baseline current of the electrical connection between the first object and the second object; comparing an electrical signal of the second object to the predetermined calibration value; and determining that the predetermined calibration value and the electrical signal differ by a predetermined threshold.

The first object may be a vehicle and the second object may be a trailer attached to the vehicle.

The computer executable instructions may cause the at least one processor to detect the second object behind the first object by detecting that the second object is within a predetermined distance of the first object during the forward movement of the first object.

The computer executable instructions may cause the at least one processor to detect the second object behind the first object by controlling to generate an ultrasonic frequency wave and detect an echo of the ultrasonic frequency wave to determine whether the second object is within the predetermined distance of the first object during the forward movement of the first object.

The computer executable instructions may cause the at least one processor to detect the second object behind the first object by determining whether an electromagnetic signal indicates that the second object is within the predetermined distance of the first object during the forward movement of the first object.

The computer executable instructions may cause the at least one processor to detect the second object behind the first object by determining whether a static portion of an image from a rear facing camera of the first object is greater than a predetermined threshold portion of the image during the forward movement of the first object.

The computer executable instructions may cause the at least one processor to detect the forward movement of the first object by determining whether a speed of the first object is greater than a predetermined threshold speed.

According to an aspect of an exemplary embodiment, a non-transitory computer readable medium comprising computer executable instructions executable by a processor to perform a method for detecting a trailer behind a vehicle is provided. The method includes: detecting that the trailer is electrically disconnected from the vehicle by using a first detection method; detecting a forward movement of the vehicle; based on the detecting that the trailer is electrically disconnected from the vehicle using the first detection method and the detecting the forward movement of the vehicle, determining whether the trailer is present behind the vehicle using a second detection method; and in response to determining that the trailer is present behind the vehicle using the second detection method, controlling to output a notification alerting that the trailer is electrically disconnected.

Other objects, advantages and novel features of the exemplary embodiments will become more apparent from the following detailed description of exemplary embodiments and the accompanying drawings.

DETAILED DESCRIPTION

Figure 1:
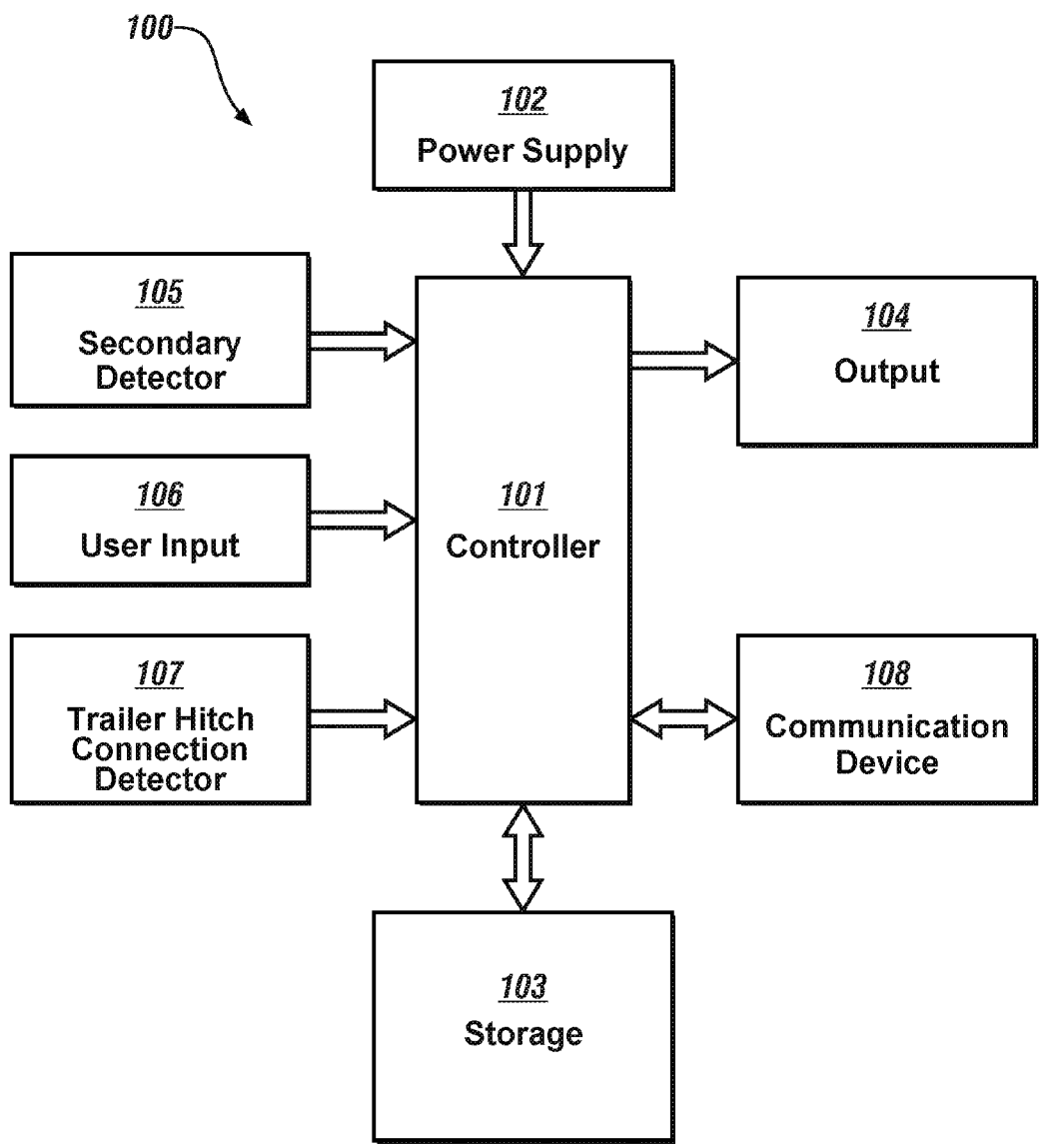
FIG. 1 shows a block diagram of an apparatus that detects the presence of an object and corresponding verification of an electrical connection to the vehicle according to an exemplary embodiment.

An apparatus and method that detect the presence of a trailer will now be described in detail with reference to FIGS. 1-4 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element, unless it is stated that a first element is "directly" connected to, formed on, or disposed on the second element.

In addition, if a first element is configured to "receive" or "send" information from or to a second element, the first element may receive or send the information directly from or to the second element, receive or send the information via a bus, receive or send the information via a network, or receive or send the information via intermediate elements, unless the first element is indicated to receive information "directly" from the second element or send information "directly" to the second element.

Throughout the disclosure, one or more of the elements disclosed may be combined into a single device or combined into one or more devices. In addition, individual elements may be provided on separate devices.

A trailer or second object attached to a vehicle or first object may be detected using various methods. For example, a signal of an electrical connection between a vehicle or first object and a trailer or second object may be detected and/or processed to determine whether a trailer is connected to a vehicle.

FIG. 1 shows a block diagram of an apparatus for detecting a status of an electrical connection with an object 100 (i.e., connection status detection apparatus, trailer connection status detection apparatus, electrical connection status detection apparatus), according to an exemplary embodiment. As shown in FIG. 1, the connection status detection apparatus 100, according to an exemplary embodiment, includes a controller 101, a power supply 102, a storage 103, an output 104, a secondary detector 105, a user input 106, a trailer hitch connection detector 107, and a communication device 108. However, the connection status detection apparatus 100 is not limited to the aforementioned configuration and may be configured to include additional elements and/or or omit one or more of the aforementioned elements.

The controller 101 controls the overall operation and function of the connection status detection apparatus 100. The controller 101 may control one or more of a storage 103, an output 104, a secondary detector 105, a user input 106, a trailer hitch connection detector 107, and a communication device 108 of the connection status detection apparatus 100. The controller 101 may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components.

The power supply 102 provides power to one or more of the storage 103, the output 104, the secondary detector 105, the user input 106, the trailer hitch connection detector 107, and the communication device 108 of the connection status detection apparatus 100. The power supply 102 may include one or more from a battery, an outlet, a capacitor, a solar energy cell, a generator, a wind energy device, an alternator, or other electrical connection, etc.

The storage 103 is configured for storing information and retrieving information used by the connection status detection apparatus 100. The storage 103 may be controlled by the controller 101 to store and retrieve condition information and status information such as a condition information from sensors or devices and status information of a vehicle electrical system or trailer hitch connection. The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions. The storage 103 may also include the computer instructions configured to be executed by a processor to perform the functions of the connection status detection apparatus 100.

The output 104 outputs information in a visual, audible and/or haptic form. The output 104 may be controlled by the controller 101 to provide outputs to a user of the connection status detection apparatus 100. The output 104 may include one or more from among a speaker, a display, a heads up display, a windshield display, haptic feedback device, a vibration device, a tactile feedback device, a tap-feedback device, a holographic display, an instrument panel display, an instrument light, and an indicator light.

The output 104 may output one or more notifications including one or more from among an audible notification, a light notification, a display notification indicating that an object or trailer is not properly connected to a vehicle, a display notification indicating that an object or trailer is behind the vehicle, a spoken notification indicating that an object or trailer is not properly connected to a vehicle, a spoken notification indicating that an object or trailer is behind the vehicle, and both a display notification and a spoken notification.

The output 104 may output a notification that provides an alert that notifies an operator of the vehicle or first object that the trailer or second object is connected to or attached to the vehicle or first object. The notification may also provide an alert of an improper electrical connection between the vehicle or first object and the trailer or second object. Moreover, the notification may also provide an alert of a bulb outage at the trailer or second object. Such an alert may notify a user or driver of the vehicle or first object to properly connect the trailer or second object or to replace a faulty bulb that is present on the trailer or second object.

The secondary detector 105 is configured to detect condition information of a vehicle, a first object, a second object behind the first object, a trailer behind the vehicle, etc. In particular, the secondary detector 105 may be configured to receive condition information of the vehicle and provide the condition information to the controller 101 of the connection status detection apparatus 100. The condition information may be timestamped to determine a time at which a condition occurs.

For example, the secondary detector 105 may include sensors and devices such as one or more of accelerometers, global positioning system (GPS) device, speedometers, etc., that detect the forward movement, acceleration, location and/or speed of the vehicle or first object and the second object or trailer behind the first object or vehicle. For example, the secondary detector 105 may include a speedometer that is used to detect the forward movement of the vehicle or first object by determining whether a speed of the vehicle or first object is greater than a predetermined threshold speed.

The secondary detector 105 may also detect a distance between the second object or trailer and the first object or vehicle. According to an exemplary embodiment, the secondary detector 105 may also comprise a sensor including one or more from among a camera, an infrared camera, a laser sensor, a radar sensor, a microwave sensor, an electromagnetic sensor etc. The sensors may be configured to measure a distance between the second object or trailer and the first object or vehicle.

For example, the secondary detector 105 may be an ultrasonic sensor configured to generate an ultrasonic frequency wave and detect an echo of the ultrasonic frequency wave that is used to determine whether the object is within the predetermined distance of the vehicle during or after the detecting of the forward movement of the vehicle. In another example, the secondary detector 105 may be an electromagnetic sensor configured to detect an electromagnetic signal indicates that the object is within the predetermined distance of the vehicle during or after the detecting of the forward movement of the vehicle. In yet another example, the secondary detector 105 may be a rear facing camera of the vehicle that is used to determine whether a static portion of an image from a rear of the vehicle is greater than a predetermined threshold portion of the image during or after the detecting the forward movement of the vehicle.

The user input 106 is configured to provide information on inputs and commands to the connection status detection apparatus 100. Specifically, the user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be integrated with output 104. In an exemplary embodiment, the user input 106 may receive a user input to enable, acknowledge or dismiss the notification output by the output 104.

The trailer hitch connection detector 107 is configured to detect a status of an electrical connection used to determine whether a trailer or second object is present behind a vehicle or first object and to provide information on the status to the controller 101 of the connection status detection apparatus 100. The trailer hitch connection detector 107 may determine the status by detecting whether an electrical connection exists between a trailer or second object and a vehicle or first object. If the electrical connection does not exist, the status of the electrical connection is determined to be disconnected or abnormal. The trailer hitch connection detector 107 may also determine a status by retrieving a predetermined calibration value based on a measured baseline current of an electrical connection between the vehicle or first object and the trailer or second object and comparing the predetermined calibration value to an electrical signal of the second object or trailer. The controller 101 may then determine the status of the electrical connection is abnormal if measurements from the trailer hitch connection detector 107 determine that the predetermined calibration value and the electrical signal of second object or trailer differ by a predetermined threshold.

The communication device 108 may be used by the connection status detection apparatus 100 to communicate with various types of external apparatuses according to various communication methods. The communication device 108 may be used to send/receive status information and/or condition information by the controller 101 to/from external devices. In addition, the communication device 108 may be used for providing a notification via a mobile device such as mobile phone, smart watch, laptop, tablet, etc. so that the notification is output by the mobile device.

The communication device 108 may include various communication modules such as a broadcast receiving module, a near field communication (NFC) module, a GPS module, and a wireless communication module. The broadcast receiving module may include a terrestrial broadcast receiving module including an antenna to receive a terrestrial broadcast signal, a demodulator, and an equalizer, and a digital multimedia broadcasting (DMB) module to receive and process a DMB broadcast signal. The NFC module is a module that communicates with an external apparatus located at a nearby distance according to an NFC method. The GPS module is a module that receives a GPS signal from a GPS satellite and detects a current location. The wireless communication module is a module that is connected to an external network by using a wireless communication protocol such as Wi-Fi or IEEE communication protocol and communicates with the external network. The wireless communication module may further include a mobile communication module that accesses a mobile communication network and performs communication according to various mobile communication standards such as $3^{rd}$ generation (3G), 3rd generation partnership project (3GPP), long term evolution (LTE), Bluetooth, or ZigBee.

According to an exemplary embodiment, the controller 101 of the connection status detection apparatus 100 is configured to determine a status of an electrical connection between a second object or trailer and a vehicle or first object. The controller 101 further detects a forward movement of the vehicle or first object. Based on the status of the electrical connection and the detecting of the forward movement, the controller 101 is configured to detect a trailer or a second object behind the vehicle or first object. If the controller 101 detects a trailer or a second object behind the vehicle or first object, the controller 101 is configured to control to output a notification that alerts of at least one from among a presence of the object and the status of the electrical connection. For example, the notification provides an alert that notifies an operator of the vehicle or first object that the trailer or second object is connected or attached to the vehicle or first object. The notification may also provide an alert of a bulb outage on the trailer or second object or an abnormal or disconnected electrical connection between the vehicle or first object and the trailer or second object.

Figure 2:
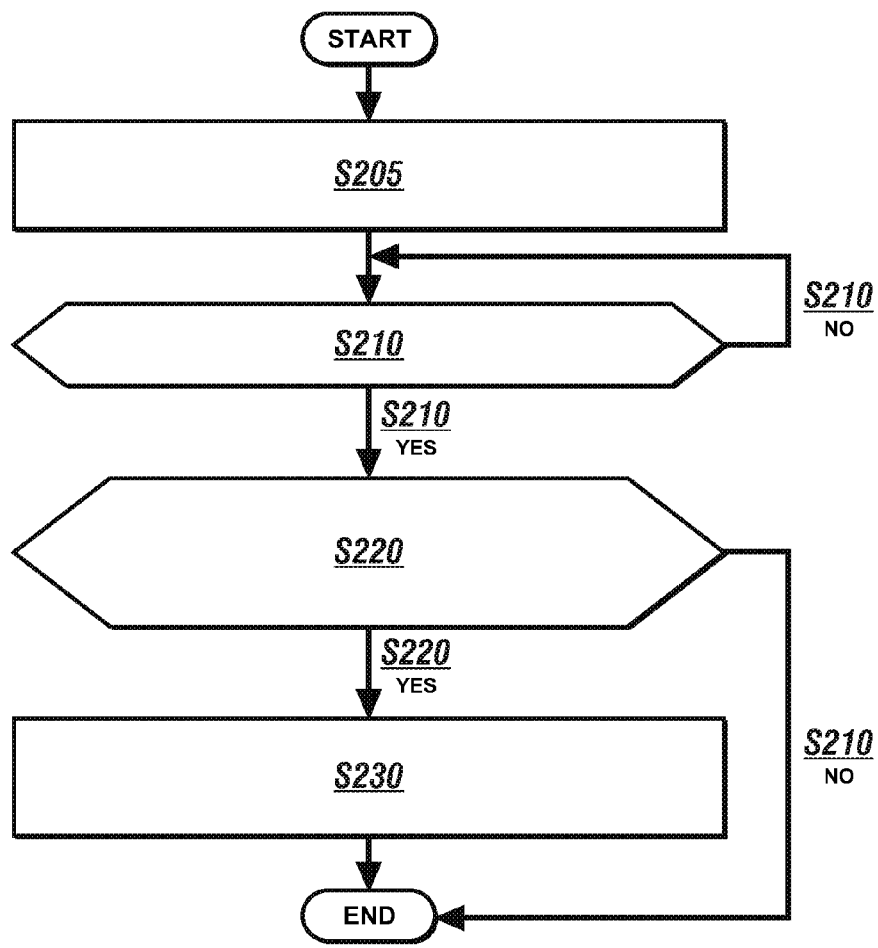
FIG. 2 shows a flowchart for a method of detecting the presence of an object according to an exemplary embodiment.

FIG. 2 shows a flowchart for method for detecting an object behind a vehicle according to an exemplary embodiment. The method of FIG. 2 may be performed by the connection status detection apparatus 100 or may encoded into a computer readable medium as instructions that are executable by a computer to perform the method.

Referring to FIG. 2, a status of an electrical connection between a first object or vehicle and a second object or trailer is determined in operation S205. Forward movement of the first object or vehicle is detected in operation S210. If the first object or vehicle is moving forward (operation S210-Yes), the method proceeds to operation S220. Otherwise (operation S210-No), the method may continue to check whether forward movement of the first object or vehicle is detected in operation S210. In operation S220, based on the status of electrical connection and the detecting of the forward movement of the first object or vehicle, it is determined whether a second object or trailer is present behind the vehicle or first object (operation S220). If a second object or trailer is present behind the first object or vehicle and the status of the electrical connection indicates that the connection is disconnected, abnormal or improperly connected (operation S220-Yes), at least one from among a notification that alerts of the presence of a trailer or second object or an improper connection to a trailer is output (operation S230). Otherwise, the process ends (operation S220-No).

The notification provides an alert that notifies an operator of the vehicle or first object that the trailer or second object is connected or attached to the vehicle or first object. The notification may also alert of an improper or abnormal electrical connection between the vehicle or first object and the trailer or second object. Moreover, the notification may also provide an alert of a bulb outage of a bulb at the trailer or second object.

Figure 3:
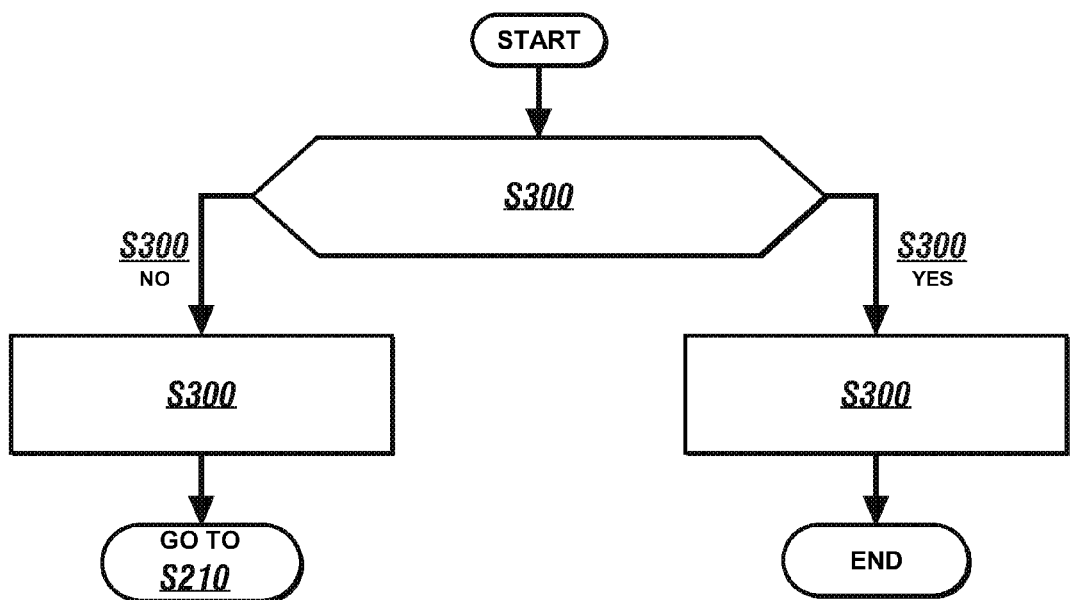
FIG. 3 shows a flowchart for a method of determining a status of an electrical connection according to an aspect of an exemplary embodiment.

FIG. 3 shows a flowchart for a method of determining a status of an electrical connection according to an aspect of an exemplary embodiment. The method of FIG. 3 may be performed by the connection status detection apparatus 100 or may encoded into a computer readable medium as instructions that are executable by a computer to perform the method.

Referring to FIG. 3, it is determined whether a vehicle or first object is electrically connected to a second object or trailer (operation S300). If it is determined that the vehicle or first object is electrically disconnected from the second object or trailer (operation S300-NO), then the method proceeds to operation S210. If it is determined that the vehicle is electrically connected to the object (operation S300-YES), the process ends.

Figure 4:
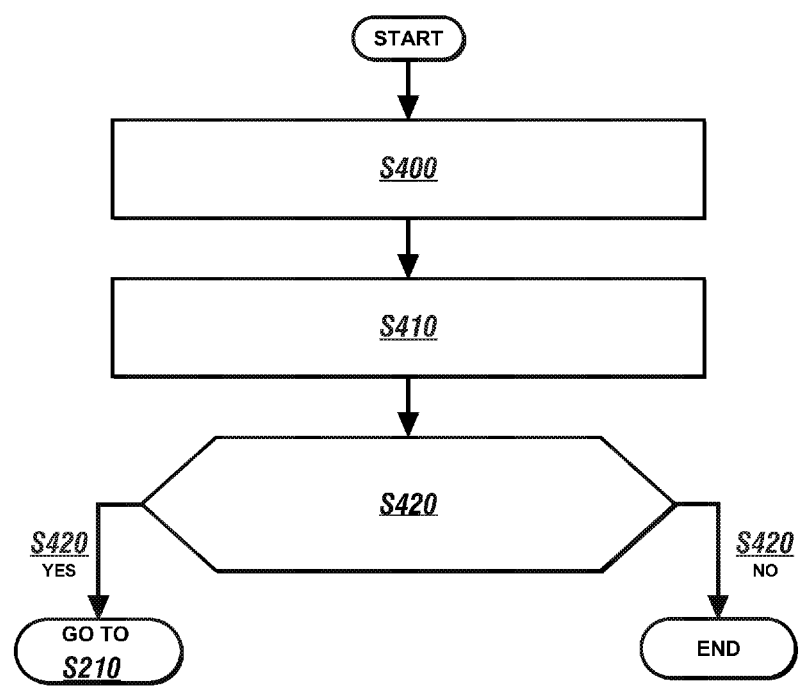
FIG. 4 shows a flowchart for a method of determining a status of an electrical connection according to an aspect of an exemplary embodiment.

FIG. 4 shows a flowchart for a method of determining a status of an electrical connection according to an aspect of an exemplary embodiment. The method of FIG. 4 may be performed by the connection status detection apparatus 100 or may encoded into a computer readable medium as instructions that are executable by a computer to perform the method.

Referring to FIG. 4, a predetermined calibration value based on a measured baseline current of the electrical connection between a vehicle or first object and a trailer or second object is retrieved in operation 5400. The electrical signal of the second object or trailer is then compared to the predetermined calibration value in operation 5410. Next, it is determined whether the predetermined calibration value and the measured electrical signal differ by a predetermined threshold in operation S420. If it is determined that the predetermined calibration value and the electrical signal of the trailer or second object differ by a predetermined threshold (operation, S420-YES), then it is determined whether forward movement of a first object or a vehicle is detected in operation S210. If it is determined that the predetermined calibration value and the electrical signal of the trailer or second object do not differ by a predetermined threshold (operation, S420-NO), the process ends.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for detecting a status of an electrical connection with an object behind a vehicle, the method comprising:
   determining the status of the electrical connection between the object and the vehicle;
   detecting a forward movement of the vehicle;
   based on the status of the electrical connection and the detecting of the forward movement, detecting the object behind the vehicle; and controlling to output a notification that alerts of the status of the electrical connection,
wherein the determining the status of the electrical connection comprises:
retrieving a predetermined calibration value based on a measured baseline current of the electrical connection between the vehicle and the object;
comparing an electrical signal of the object to the predetermined calibration value; and
determining that the electrical signal of the object and the predetermined calibration value differ by a predetermined threshold.

2. The method of claim 1, wherein the determining the status of the electrical connection comprises determining that the vehicle is electrically disconnected from the object.

3. The method of claim 1, wherein the object comprises a trailer attached to the vehicle.

4. The method of claim 1, wherein the detecting the object behind the vehicle comprises detecting that the object is within a predetermined distance of the vehicle during the forward movement of the vehicle.

5. The method of claim 4, wherein the detecting the object behind the vehicle comprises controlling to generate an ultrasonic frequency wave and detecting an echo of the ultrasonic frequency wave to determine whether the object is within the predetermined distance of the vehicle during the forward movement of the vehicle.

6. The method of claim 4, wherein the detecting the object behind the vehicle comprises determining whether an electromagnetic signal indicates that the object is within the predetermined distance of the vehicle during the forward movement of the vehicle.

7. The method of claim 1, wherein the detecting the object behind the vehicle comprises determining whether a static portion of an image from a rear facing camera of the vehicle is greater than a predetermined threshold portion of the image during the forward movement of the vehicle.

8. The method of claim 1, wherein the detecting the forward movement of vehicle comprises determining whether a speed of the vehicle is greater than a predetermined threshold speed.

9. A non-transitory computer readable medium comprising computer executable instructions executable by a processor to perform the method of claim 1.

10. An apparatus for detecting a status of an electrical connection with a second object behind a first object, the apparatus comprising:
at least one memory comprising computer executable instructions; and
at least one processor configured to read and execute the computer executable instructions, the computer executable instructions causing the at least one processor to:
determine the status of the electrical connection between the first object and the second object;
detect a forward movement of the first object;
based on the status of the electrical connection and the detecting of the forward movement, detect a second object behind the first object; and
control to output a notification alerting of the status of the electrical connection,
wherein the computer executable instructions further cause the at least one processor to determine the status of the electrical connection between the first object and the second object by:
retrieving a predetermined calibration value based on a measured baseline current of the electrical connection between the first object and the second object;
comparing an electrical signal of the second object to the predetermined calibration value; and
determining that the predetermined calibration value and the electrical signal differ by a predetermined threshold.

11. The apparatus of claim 10, wherein the computer executable instructions further cause the at least one processor to determine the status of the electrical connection between the first object and the second object by:
determining that the status of the electrical connection indicates the second object is electrically disconnected from the first object.

12. The apparatus of claim 10, wherein the first object comprises a vehicle and the second object comprises a trailer attached to the vehicle.

13. The apparatus of claim 10, wherein the computer executable instructions cause the at least one processor to detect the second object behind the first object by detecting that the second object is within a predetermined distance of the first object during the forward movement of the first object.

14. The apparatus of claim 13, wherein the computer executable instructions cause the at least one processor to detect the second object behind the first object by controlling to generate an ultrasonic frequency wave and detect an echo of the ultrasonic frequency wave to determine whether the second object is within the predetermined distance of the first object during the forward movement of the first object.

15. The apparatus of claim 13, wherein the computer executable instructions cause the at least one processor to detect the second object behind the first object by determining whether an electromagnetic signal indicates that the second object is within the predetermined distance of the first object during the forward movement of the first object.

16. The apparatus of claim 10, wherein the computer executable instructions cause the at least one processor to detect the second object behind the first object by determining whether a static portion of an image from a rear facing camera of the first object is greater than a predetermined threshold portion of the image during the forward movement of the first object.

17. The apparatus of claim 10, wherein the computer executable instructions cause the at least one processor to detect the forward movement of the first object by determining whether a speed of the first object is greater than a predetermined threshold speed.

18. A non-transitory computer readable medium comprising computer executable instructions executable by a processor to perform a method for detecting a status of an electrical connection with a trailer behind a vehicle, the method comprising:
detecting that the trailer is electrically disconnected from the vehicle by using a first detection method;
detecting a forward movement of the vehicle;
based on the detecting that the trailer is electrically disconnected from the vehicle using the first detection method and the detecting the forward movement of the vehicle, determining whether the trailer is present behind the vehicle using a second detection method; and
in response to determining that the trailer is present behind the vehicle using the second detection method, controlling to output a notification alerting that the trailer is electrically disconnected.

\* \* \* \* \*